United States Patent [19]

Dennstedt

[11] Patent Number: 5,460,066
[45] Date of Patent: Oct. 24, 1995

[54] ADJUSTABLE CUTTING TOOL HOLDER

[76] Inventor: Jack W. Dennstedt, 11408 Jonquil, Coon Rapids, Minn. 55433

[21] Appl. No.: 905,038

[22] Filed: Jun. 26, 1992

[51] Int. Cl.⁶ .................................................. B23B 29/12
[52] U.S. Cl. ........................................................ 82/137
[58] Field of Search ............................ 82/137, 158, 161

[56] References Cited

U.S. PATENT DOCUMENTS

| | | | |
|---|---|---|---|
| 767,598 | 8/1904 | Search et al. | 82/137 |
| 874,176 | 12/1907 | Fischer | 82/137 |
| 1,986,862 | 1/1935 | Svenson | 82/137 |
| 2,742,800 | 4/1956 | Miller | 82/158 |
| 2,897,578 | 8/1959 | Strom | 82/137 |
| 3,115,799 | 12/1963 | Nitz | 82/158 |
| 4,759,244 | 7/1988 | Engibarov | 82/158 |
| 5,092,206 | 3/1992 | Ronzoni | 82/158 |

FOREIGN PATENT DOCUMENTS

| | | | |
|---|---|---|---|
| 10774 | of 1899 | United Kingdom | 82/161 |
| 25258 | of 1904 | United Kingdom | 82/137 |

*Primary Examiner*—Jack W. Lavinder
*Attorney, Agent, or Firm*—Anthony G. Eggink

[57] ABSTRACT

An adjustable cutting tool holder assembly for positioning a cutting tool. The adjustable cutting tool holder has a base portion for mounting to a machine structure, a tool holder portion slidingly engaging the base portion, and an adjustment assembly constructed and arranged to adjustably unite the base portion and the tool holder portion.

20 Claims, 5 Drawing Sheets

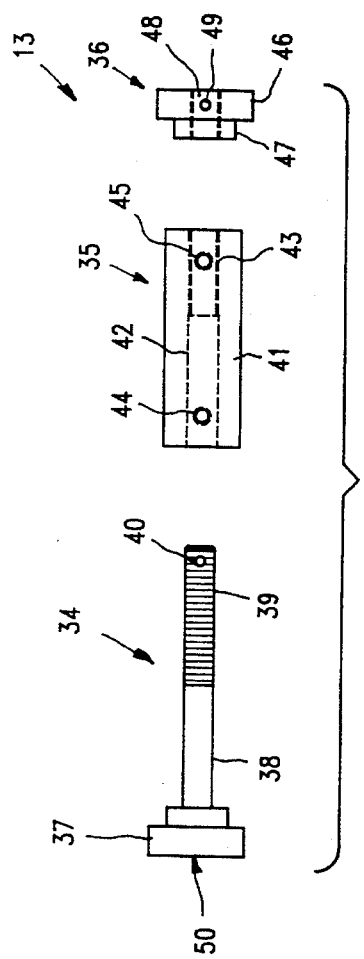
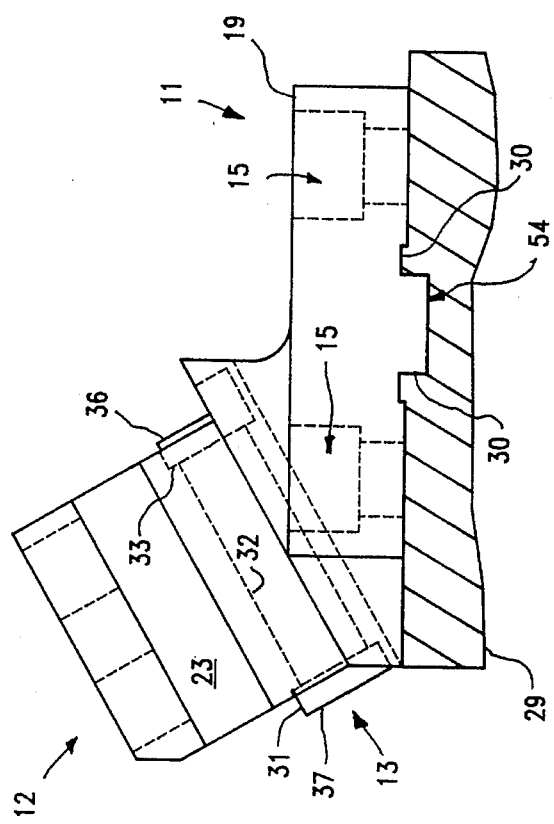
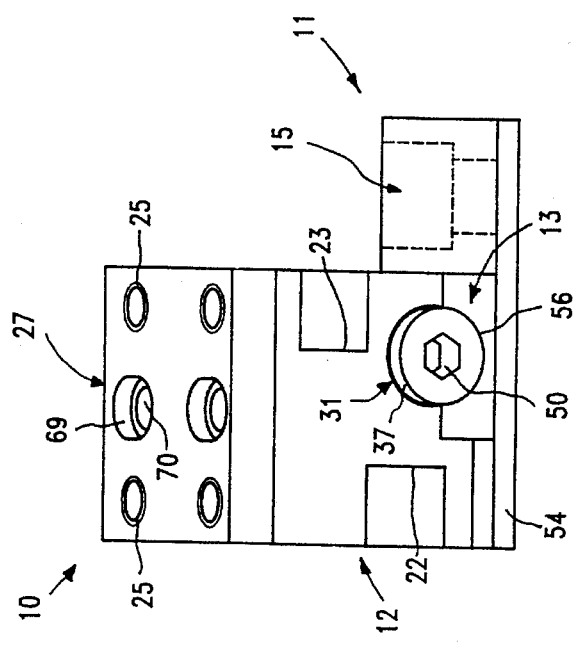

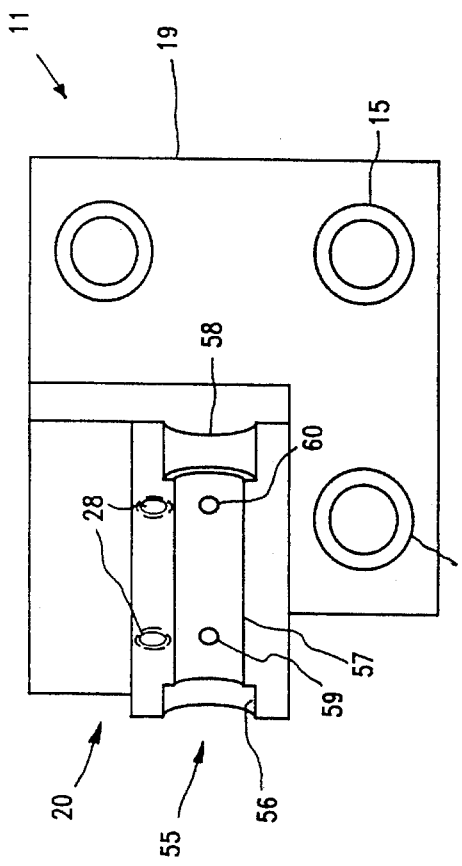
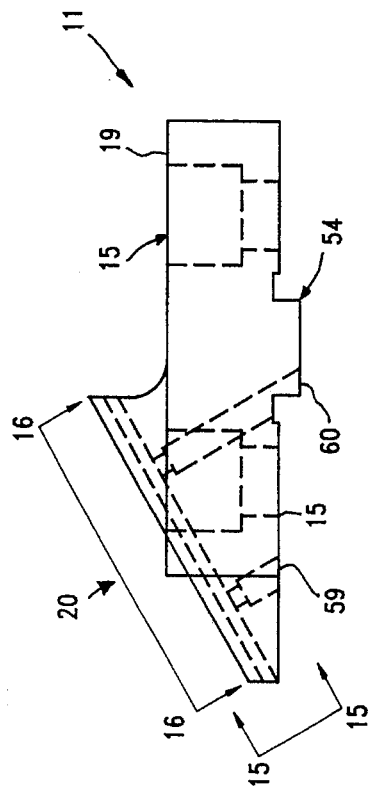
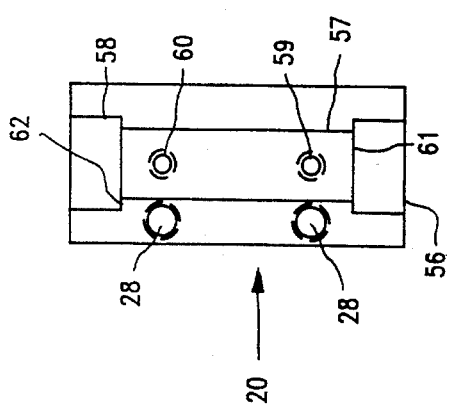
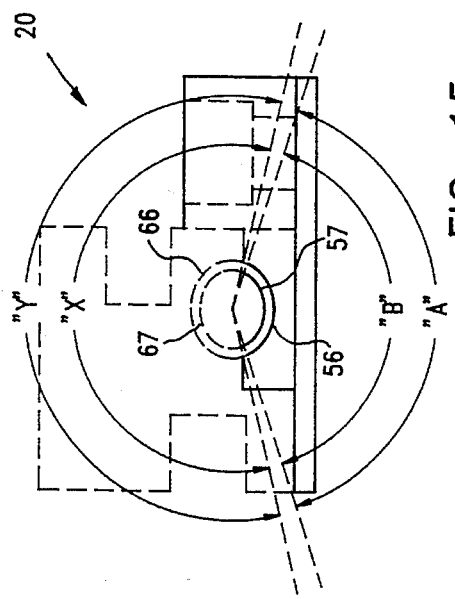

ADJUSTABLE CUTTING TOOL HOLDER

BACKGROUND OF THE INVENTION

This invention relates generally to cutting tool holders and particularly to an adjustable cutting tool holder or assembly for automatic cutting machines, such as screw machines.

Automatic cutting machines are used to cut and form various precision products and product parts used, for example, in medical or telecommunications instruments. The use of precision boring bars or other adjustable cutting inserts to manufacture such products or parts require fine tolerances of up to 0.0005 inches. A typical screw machine uses a cutting tool or knee tool holder which has slots wherein a tool having a carbide or high speed steel cutting member or insert is fixed. The cutting tool is brought into position with respect to a metal workpiece, for example, which is rotated on a lathe mechanism so that the workpiece can be cut and machined accordingly. The position of the cutting members with respect to the workpiece can be moved by either moving the entire holder or by moving the tool within the holder slots.

The principle limitations of prior art or existing cutting tool holders are that they are difficult to adjust and such adjustment cannot be accomplished with precision. The prior art primarily shows unitary block structures which have no adjustable features and which require the use of a hammer or other device to tap either the tool relative to the holder or the holder base relative to the machine turret for positioning purposes. Thus, the tool holder itself is loosened, tapped with a hammer, for example, and then retightened or alternatively, clamping means on the holder are loosened and the cutting member is moved with respect to the holder slot and then retightened. In view of the precise tolerances required for most cutting purposes, this process is laborious, time consuming and imprecise.

The cutting tool holder of this invention is an adjustable assembly utilizing adjustment means to position a cutting tool with respect to a rotated working piece. The adjustable cutting tool holder has a base portion and an adjustable block or holder portion united by an adjusting mechanism. This adjustable structure eliminates the requirement of tapping the tool holder or cutting tool with a hammer for proper adjustment of the cutting tool, and provides an easy and precise means to accurately position the cutting tool with respect to the workpiece.

SUMMARY OF THE INVENTION

The present invention provides an adjustable cutting tool holder for adjustably and securely positioning a cutting tool. The adjustable cutting tool holder has a lower base portion for mounting to a machine structure turret, an upper tool holder or block portion slidingly engaging the base portion, and an adjustment mechanism constructed and arranged to adjustably unite the base portion and the block portion.

In particular, the invention provides an adjustable cutting tool holder, comprising a base portion for mounting to an external machine structure, the base portion having a top mating surface. A block portion has a bottom mating surface slidably disposed on the base portion top mating surface, the block portion having means to engage at least one cutting tool. A cylindrical void is formed at the mating interface between the base portion top surface and the block portion bottom surface. An adjustment mechanism is disposed in the cylindrical void, and constructed and arranged to adjustably unite the base portion and the block portion. The adjustment mechanism has a stationary linear guide means and a rotatable block movement means coupled with the linear guide means. The base portion has means to couple with the external structure. The block portion has at least one slot for enclosing a portion of the cutting tool and locking screw means for engaging the enclosed cutting tool portion.

The adjustable tool holder assembly of this invention provides a quick and accurate means to position a cutting tool with respect to a workpiece. The base portion is adapted to be adjustably mounted to a machine, particularly to the turret of an automatic screw machine. The upper block portion is constructed and arranged to adjustably hold a cutting tool. The adjusting assembly provides accurate and adjustable positioning of the tool block with respect to the base portion.

These and other benefits of this invention will become clear from the following description by reference to the drawings.

BRIEF DESCRIPTION OF THE DRAWINGS

FIG. 5 is a front view of another embodiment of the tool holder;

FIG. 6 is a side view of the tool holder of FIG. 5;

Figure 12:
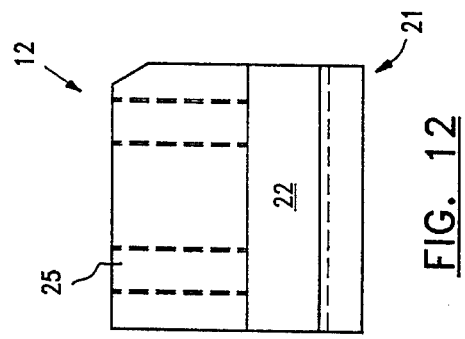
Figure 9:
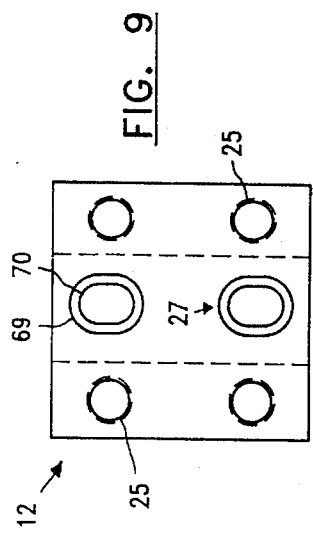
Figure 8:
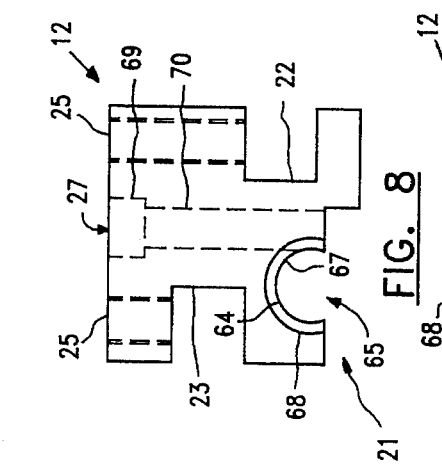
Figure 10:
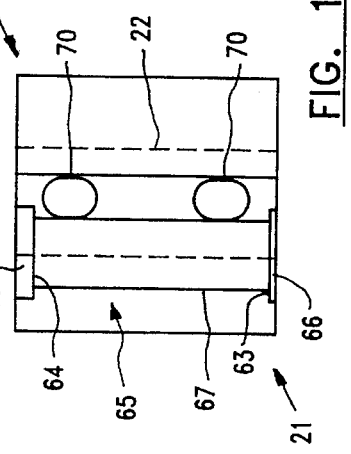
Figure 11:
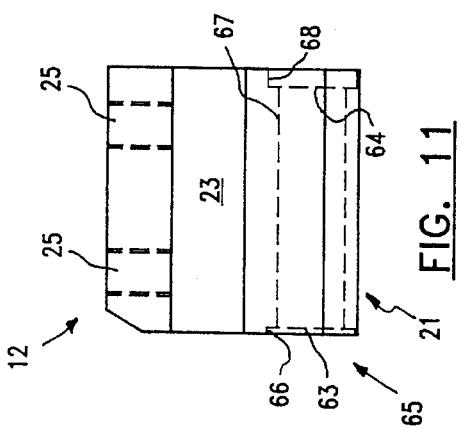

FIB. 7 is an exploded view of the adjustment assembly of the tool holder of the present invention;

FIG. 8 is a front view of the top block member of the tool holder;

FIG. 9 is a top view of the block member of FIG. 8;

FIG. 10 is a bottom view of the block member;

FIG. 11 is a left side view of the block member;

FIG. 12 is a right side view of the block member;

FIG. 13 is a side view of the base member of the tool holder of FIGS. 5 and 6;

FIG. 14 is a top view of the base member of FIG. 13;

FIG. 15 is a front view of the base member taken from line 15—15 of FIG. 13; and FIG. 16 is a top view of the adjuster groove of the base member taken along line 16—16 of FIG. 13.

DESCRIPTION OF THE PREFERRED EMBODIMENTS

Cutting machines such as screw machines are well known and widely used in the tooling and machining industry. These machines are used to cut and form screws and various precision machined parts for use, for example, in medical and telecommunications instruments. Formation of these precision parts require minimal tolerances in the range, for example, of 0.0005 inches (0.0013 cm).

Figure 1:
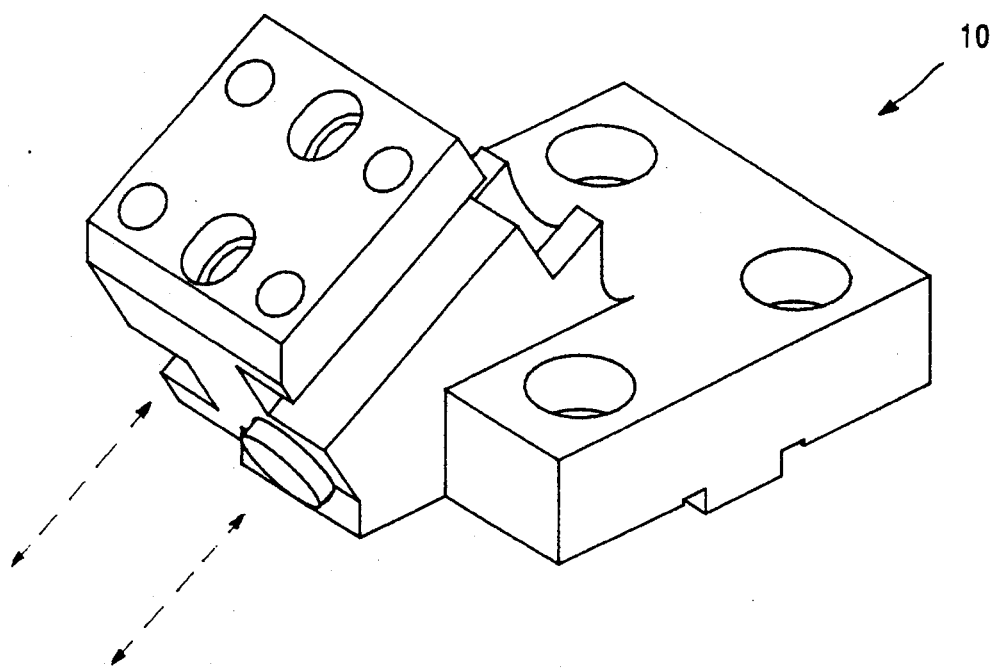
FIG. 1 is a perspective view of the adjustable tool holder assembly of the present invention, and which shows the alignment of cutting tools therein.
Figure 2:
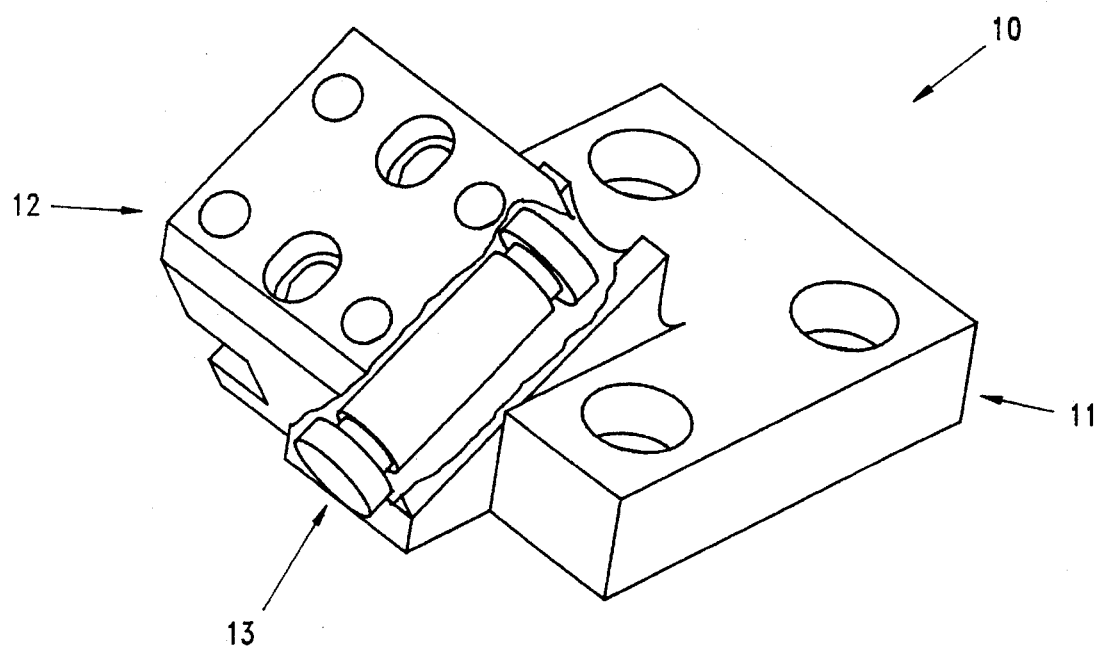
FIG. 2 is a perspective view of the tool holder of FIG. 1 having a portion of the block member removed to expose the adjustment assembly.

Referring to FIGS. 1 and 2 the cutting tool or knee tool holder 10 of the instant invention is used in conjunction with cutting machines to engage and position removable cutting tools having carbide or other cutting members or inserts. As is known, the cutting tool holder 10 is positionable on the turret of the cutting machine (not shown), proximate the metal or other workpiece held by lathe means of the cutting machine. The removable cutting tools are then held in a fixed position by the tool holder 10 for cutting engagement with the rotated workpiece. The cutting tools are subjected to extreme forces during the cutting process and are therefore prone to wear. An important aspect of this invention is that the position of the cutting tool is easily adjustable. Adjustment of the cutting tool position allows the user to accommodate for normal wear on the cutting tool and therefore maintain precision cutting tolerances throughout the cutting process.

Figure 3:
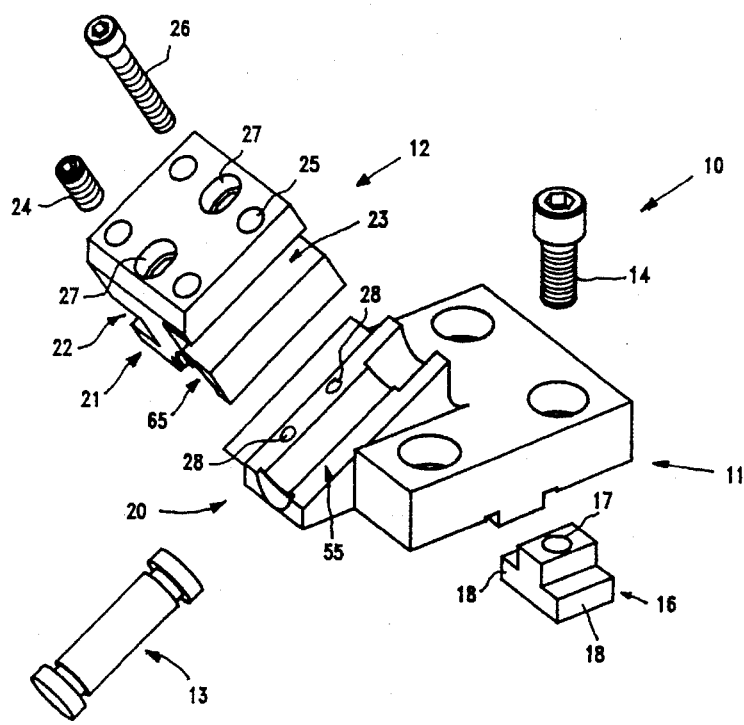
FIG. 3 is an exploded view of the tool holder of FIG. 1 showing, generally, its front side.
Figure 4:
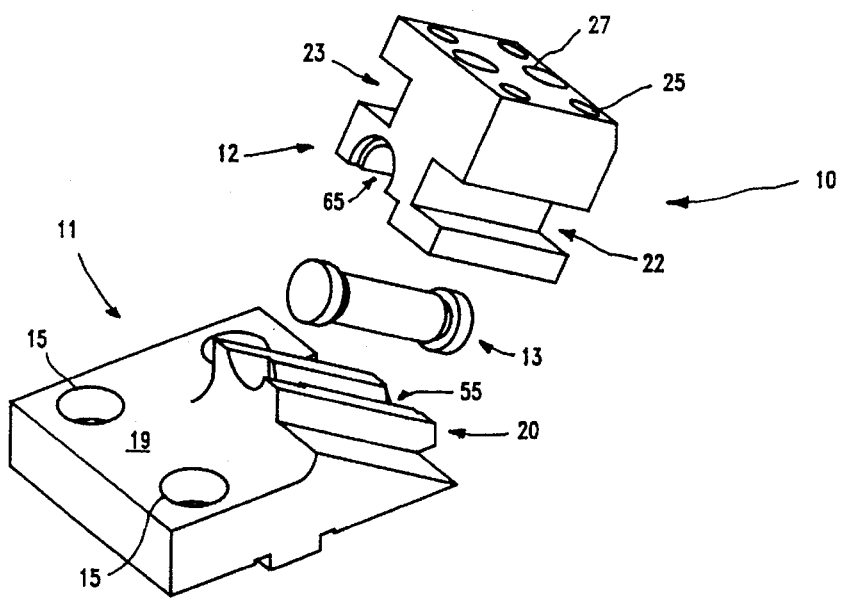
FIG. 4 is an exploded view of the tool holder showing, generally, its back side.

Referring to FIGS. 2–4, the adjustable cutting tool holder 10 basically comprises a base member 11, a holder or block member 12, and an adjusting mechanism or assembly 13. The base member 11 is shown to have a generally rectangular configuration, including a flat body portion 19 and a slanted slide portion 20 which is angled with respect to the horizontal plane of the base 11, approximately 30 degrees. The base member 11 is preferably constructed of hardened steel or a similarly hard rigid material. The block member 12 is shown to have a generally cubic configuration with a pair of tool receiving slots 22 and 23 disposed in opposing sides of the block 12 and a slanted slide surface 21 on the bottom of the block 12. The block member 12 is constructed of a rigid material similar to that of the base member 11.

The block 12 is slidably disposed on the base 11 so that their respective slide surfaces 20 and 21 mate. Additionally, each slide surface 20 and 21 has a hemicylindrical adjuster bore or channel 55 and 65, respectively, which are aligned with each other so as to form a complete, cylindrical channel. The adjusting assembly 13 is disposed within the cylindrical channel as is described further below. The adjusting assembly 13 is comprised of several components, the rotation of which within the cylindrical channel formed between the base 11 and block 12 causes the position of the block 12 to slidably move on the base 11, as will also be described further below.

Returning to a discussion of the base 11, FIGS. 3 and 4 show an base embodiment having a flat bottom, and wherein three (3) mounting bolt apertures 15 are vertically disposed in the body 19. Mounting bolts 14 extend through apertures 15 for connection with t-nuts 16. The t-nuts 16 have a generally "t-shaped" configuration with opposing outwardly extending arms 18 and a top, central threaded aperture 17. The arms 18 mate with and are retained by complimentary slots in the screw machine turret (not shown). Aperture 17 receives mounting bolt 14 such that actuation or turning of the seated bolt 14 draws the t-nut 16 upwardly toward the bottom of the base 11 to mount the base 11 on the machine turret. An alternative base 11 bottom is shown in FIGS. 5 and 6, wherein the base 11 has a transversely oriented mounting ridge 54 which mates with a complimentary turret 29 slot formed between two parallel ridges 30. The base 11 is then secured to the turret 29 by bolts (not shown) via apertures 15.

Referring also to FIGS. 13–16, the adjuster channel 55 of base 11 comprises a first or front groove or bore 56, a second or middle groove 57 and a third or back groove 58. The front and back grooves 56 and 58 are inset a predetermined distance or width from their respective ends of the base 11, and are shown to be linked by the middle groove 57. The front and back grooves 56 and 58 have a deeper bore of a larger radius "A" (approximately 146 degrees) than the radius "B" (approximately 133 degrees) of middle groove 57. This differential bore depth creates retaining notches or ledges 61 and 62 at the interface between the middle bore 57 and the respective front and back bores 56 and 58. Apertures 59 and 60 are disposed in the bottom of the middle groove 57. The apertures 59 and 60 extend through the base 11 to open at its bottom surface. As will be discussed in detail below, the apertures 59 and 60 allow extension therethrough of set screws (not shown) for connection with the adjusting assembly 13. Additionally, a pair of threaded apertures 28 are disposed in the slide surface 20 of the base 11. These apertures 28 are aligned with cooperating apertures in the block 12 and mate with block locking bolts 26 to allow locking of the block 12 in its adjusted position on the base 11 as will also be discussed further below.

Referring also to FIGS. 8–12, the block 12 further comprises several threaded apertures 25 disposed on the top surface of the block 12, through which are extended tool locking bolts 24. The tool locking bolts 24 are actuated to lock cutting tools (not shown) in position in the tool slots 22 and 23. Block locking bolt apertures 27 are also disposed in the top surface of the block 12, in alignment with apertures 28 of base 11. These apertures 27 are shown to have a slightly longitudinally elongated shaft 70 and a complimentary, elongated head 69. The threaded shaft of the block locking bolt 26 extends through the aperture 27 shaft 70, while the head of the bolt 26 seats in the aperture 27 head 69. The magnitude of longitudinal elongation of these aperture 27 elements is dependent upon the extent of adjustment provided by the holder 10, as set forth further below.

The adjuster channel 65 of the block 12 comprises a first or front groove or bore 66, a second or middle groove 67, and a third or back groove 68. The front and back grooves 66 and 68 are inset a predetermined distance or width from their respective ends of the block 12, and are shown to be linked by the middle groove 67. Importantly, the inset or bore width of the front and back grooves 66 and 68 is less than that of the front and back grooves 56 and 58 of the base 11 adjuster channel 55. As best shown in FIG. 15, block adjuster channel 65 grooves 66, 67 and 68 have bore radii which are complementary to those of base adjuster channel 55 grooves 56, 57 and 58. Accordingly, front and back grooves 66 and 68 have a deeper bore of a lesser radius "X" (preferably, approximately 214 degrees) than the radius "Y" (preferably, approximately 227 degrees) of middle groove 67. Referring back to FIGS. 10 and 11, this differential bore creates retaining notches 63 and 64 at the junction between the middle groove 67 and the respective front and back grooves 66 and 68. Moreover, these groove radii provide a block adjuster channel 65 structure which, in cooperation with the adjusting assembly 13, serves to link or couple the block 12 to the base 11. Although preferred radii are disclosed, alternative radii may be utilized consistent with the teachings of this invention so long as they are greater than 180 degrees.

Referring to FIG. 7, the adjusting assembly 13 basically comprises an adjustment bolt or rotatable linear block movement means 34, a guide rail or stationary linear guide means 35, and an end knob or second circular head 36. The stationary linear guide means 35, as further discussed below, is mounted to the base member 11 and functions in cooperation with the rotatable linear block movement means 34. The adjustment bolt or rotatable linear block movement means 34 adjustably extends through an axial aperture in the guide rail 35, and the end knob 36 is mounted on the extended end of the bolt 34. The rotatable linear block movement means 34, as further discussed below, functions in cooperation with the linear guide means 35 to move block member 12 with respect to the base member 11. The bolt 34 is shown to have a cylindrical head or first circular head 37, an unthreaded shaft portion 38, and a threaded shaft portion 39. The head 37 has a predetermined width or thickness and diameter which are slightly less than that of an annular front portion 31 of a cylindrical adjuster channel formed between the base 11 and the block 12, when they are operatively connected. These sizes permit both rotational and axial movement of the head 37 with respect to the front position 31 of the channel when actuated. An adjustment slot 50, for example a hex-type mating depression, is axially disposed in head 37. A threaded aperture 40 is transversely disposed in the threaded shaft portion, proximate its end.

The guide rail 35 has a cylindrical body 41, an unthreaded axial aperture portion 42, and a threaded axial aperture portion 43. Thus, an axial aperture, consisting of an unthreaded portion 42 and a threaded portion 43, extends through the entirety of the guide rail structure 35. Connection apertures 44 and 45 are disposed on one side of the body 41. These connection apertures 44 and 45 mate with set screws extending from apertures 59 and 60 in the base 11 to maintain the guide rail 35 in a fixed position. The guide rail 35 has a predetermined length which is equivalent to the length of middle channels 57 and 67 of the base 11 and block 12, respectively. The guide rail 35 also has a diameter which is equivalent to the diameter of an annular mid-portion 32 of the cylindrical annular adjuster channel formed between the base 11 and block 12.

The end knob 36 has a predetermined width or thickness and a diameter which are slightly less than that of an annular back portion 33 of the cylindrical adjuster channel formed between the base 11 and block 12. The end knob 36 has a threaded axial aperture 48 for mating with the adjuster bolt 34 threaded end 40 which operatively extends from the guide rail 35 axial aperture. A threaded aperture 49 in the circumferential wall of the knob 36 allows a set screw (not shown) to engage the bolt 34 end 40 and thereby lock the knob 36 thereto.

The adjusting assembly 13 is disposed in an operative position in the adjuster channel 31, 32 and 33 formed between the base 11 and block 12, when they are operatively aligned. The guide rail 35 is enclosed within the middle section 32 of the channel and is fixed and prevented from being rotated therein by set screws (not shown) extending from base apertures 59 and 60 and mating with guide rail apertures 44 and 45. Also, because the guide rail 35 fixed to the base 11, and because the required radius of the block adjuster channel 65 grooves 66, 67 and 68 is such that the block 12 is held in vertical engagement with the guide rail 35, the block 12 is also held in vertical engagement with the base 11, and is prevented from moving vertically away from the base 11. Hence, the block 12 is only permitted to move slidingly longitudinally along the slanted slide surfaces 20 and 21 with respect to the base 11 by this structure. The bolt head 37 and end knob 36 are disposed, respectively, in the front and back sections 31 and 32 of the channel. Initially, the adjuster bolt head 37 and knob 36 are aligned so that they extend approximately equidistantly from the guide rail 35 and are seated in their respective channel sections 31 and 32.

The bolt head 37 may be rotatingly actuated via adjustment slot 50. Since threaded bolt shaft 39 mates with the threaded aperture portion 43 of the fixed guide rail 35, clockwise actuation of the bolt head 37 draws it into the channel front portion 31. The adjuster bolt head 37 is freely longitudinally actuatable on the base front groove 56 due to the relatively large width of the groove 56. However, because the block front groove 66 width is smaller, the adjuster bolt head 37 abuts and urges backward (up the slide surface 20) the retaining ledge 63 as it is longitudinally moved by clockwise actuation of the adjuster bolt head 37. Hence, the position of the block 12 is moved backwardly via clockwise actuation of the adjusting assembly 13. Conversely, the position of the block 12 is moved forwardly (down the slide surface 20) via counter clockwise actuation of the adjusting assembly 13. Counter clockwise actuation of the bolt head 37 withdraws it from the channel front portion 31; and such rotation is translated to the knob 36, via its connection to bolt shaft 39, as it is drawn into the channel back portion 33. And, due to the differential widths of the base 11 and block 12 back grooves 58 and 68, the circumferential periphery of the knob 36 abuts and urges forward the retaining ledge 64 as it is longitudinally moved during counter clockwise actuation. As a result, the position of the block 12 is moved forwardly. As will be readily apparent to those skilled in the art, the direction of movement discussed in the present embodiment of the invention may be reversed by modifying the thread configurations shown. Similarly, the magnitudes of movement are a function of thread type.

In use, the knee tool holder 10 described above is mounted to a cutting machine, such as the turret of an automatic screw machine, utilizing mounting bolts 14. The tool holder 10 is properly aligned with the mounting turret via either the T-nut (16) or mounting ridge (54) base 11 embodiment described above. One or more cutting tools, for example knee tools having carbide cutting inserts, are then inserted into the tool slots 22 and 23, and clamped in place via tool locking screws 24. The tool holder 10 is then adjusted to properly position the cutting tool or tools with respect to a workpiece. First, block locking screws 26 are slightly retracted (loosened) to permit longitudinal movement of the block 12 with respect to the base 11 by the adjusting assembly 13. Next, the adjusting bolt head 37 is engaged by suitable means, such as an allen-type wrench or the like, at its adjustment slot 50. The bolt head 37 is then actuated a particular angular distance to properly position the cutting member. As discussed above, in the embodiment shown, clockwise actuation causes the block 12 to move longitudinally backwardly with respect to the base 11, while counter-clockwise actuation causes the block 12 to move forwardly. Finally, the block locking screws 26 are downwardly extended (tightened) to lock the block 12 in its now adjusted position and to thereby prevent undesirable longitudinal movement with respect to the base 11.

As many changes are possible to the embodiments of this invention utilizing the teachings thereof, the descriptions above, and the accompanying drawings should be interpreted in the illustrative and not the limited sense.

That which is claimed is:

1. A cutting tool holder, comprising:
   (a) a base portion for mounting to an external machine structure;
   (b) a block portion slidably disposed on said base portion, said block portion having means to engage at least one cutting tool; and
   (c) an adjustment mechanism constructed and arranged to adjustably unite said base portion and said block portion, said adjustment mechanism comprising a stationary linear guide means coupled with a rotatable linear block movement means, said linear guide means further comprising a guide rail structure immovably fixed at a mating interface between said base portion and said block portion and having an axial aperture therethrough, and wherein said linear block movement means comprises an elongated rotatable shaft with opposing ends and being disposed in and extending from said guide rail and further comprising first and second circular heads respectively fixed at said opposing ends of said shaft.

2. The cutting tool holder of claim 1, wherein said base portion has a top mating surface and said block portion has a bottom mating surface, said top and bottom mating surfaces having a generally planar configuration and being in slidable contact with one another, and said top and bottom mating surfaces permitting slidable movement along a linear slide path.

3. The cutting tool holder of claim 2, further comprising a cylindrical void formed at said mating interface between said base portion and said block portion, said adjustment mechanism being disposed in said cylindrical void.

4. The cutting tool holder of claim 3, wherein said cylindrical void comprises a first annular bore open at a first end of said cutting tool holder and being axially aligned with said slide path, a cylindrical channel coaxially aligned with and extending from said first annular bore, and a second annular bore axially aligned with and extending from said channel, and being open at an opposing second end of said cutting tool holder.

5. The cutting tool holder of claim 4, wherein said first and second bores and said channel of said cylindrical void each have a cylindrical surface of revolution of a predetermined radius, said surfaces of revolution comprising a top surface formed in said block portion and a bottom surface formed in said base portion, and wherein said top and bottom surfaces of said first and second cylindrical bores each have a predetermined width, said width of said first bore bottom surface being greater than said width of said first bore top surface, and said width of said second bore bottom surface being greater than said width of said second bore top surface.

6. The cutting tool holder of claim 5, wherein said base portion has a means to couple with the external machine structure, and said block portion means to engage at least one cutting tool comprises a slot for enclosing a portion of the cutting and a locking screw means for engaging the enclosed cutting tool.

7. The cutting tool holder of claim 6, wherein said linear guide means comprises a cylindrical body having a predetermined length and diameter, said axial aperture extending through said body length and having a threaded portion of a predetermined length, said guide means body having at least one circumferentially disposed connection aperture; and wherein said linear block movement means comprises an elongated rotatable shaft disposed in and extending from said guide means axial aperture, and first and second circular heads fixed at respective ends of said shaft, said shaft having a predetermined length which is greater than said guide means length, said shaft having an unthreaded portion extending from a first end a predetermined length and a threaded portion extending from a second end, a predetermined length, to said unthreaded portion; and wherein said first head has a disk shaped configuration of a predetermined diameter and is integrally formed at said shaft first end, and said second head has a disk shaped configuration of a predetermined diameter with a threaded axial aperture, said second head being coupled to said shaft second end, said second head further having a means for locking with said shaft.

8. The cutting tool holder of claim 5, wherein said top and bottom surfaces of revolution of said first and second bores and said channel each have a predetermined angle of revolution, said angle of each said top surface being greater than 180 degrees, and said angle of each said bottom surface being less than 180 degrees.

9. The cutting tool holder of claim 1, wherein said guide rail structure further comprises a cylindrical body having a predetermined length and diameter, said guide rail axial aperture extending through said body length and having a threaded portion of a predetermined length, said guide rail body having at least one circumferentially disposed connection aperture.

10. The cutting tool holder of claim 1, wherein said linear block movement means shaft has a predetermined length which is greater than said guide rail length, said shaft having an unthreaded portion extending from a first end a predetermined length and a threaded portion extending from a second end, a predetermined length, to said unthreaded portion, and wherein said first head has a disk shaped configuration of a predetermined diameter and is integrally formed at said shaft first end, and said second head has a disk shaped configuration of a predetermined diameter with a threaded axial aperture, said second head being axially coupled to said shaft second end, said second head further having a means for locking with said shaft.

11. The cutting tool holder of claim 1, wherein said linear guide means comprises a cylindrical body having a predetermined length and diameter, said axial aperture extending through said body length and having a threaded portion of a predetermined length, said guide means body having at least one circumferentially disposed connection aperture; and wherein said linear block movement means comprises an elongated rotatable shaft disposed in and extending from said guide means axial aperture, and first and second circular heads fixed at respective ends of said shaft, said shaft having a predetermined length which is greater than said guide means length, said shaft having an unthreaded portion extending from a first end a predetermined length and a threaded portion extending from a second end, a predetermined length, to said unthreaded portion; and wherein said first head has a disk shaped configuration of a predetermined diameter and is integrally formed at said shaft first end, and said second head has a disk shaped configuration of a predetermined diameter with a threaded axial aperture, said second head being coupled to said shaft second end, said second head further having a means for locking with said shaft.

12. The cutting tool holder of claim 1, further comprising a cylindrical void formed at said mating interface between said base portion and said block portion, said adjustment mechanism being disposed in said cylindrical void; and wherein said cylindrical void comprises a first annular bore open at a first end of said cutting tool holder and being axially aligned with said slide path, a cylindrical channel coaxially aligned with and extending from said first annular bore, and a second annular bore axially aligned with and extending from said channel, and being open at an opposing second end of said cutting tool holder; said first and second bores and said channel of said cylindrical void each having a top surface of revolution formed in said block portion and having an angle of revolution greater than 180 degrees, and a bottom surface of revolution formed in said base portion and having an angle of revolution less than 180 degrees, and wherein said top and bottom surfaces of said first and second cylindrical bores each have a predetermined width, said width of said first bore bottom surface being greater than said width of said first bore top surface, and said width of said second bore bottom surface being greater than said width of said second bore top surface; said linear guide means comprising a cylindrical body disposed in said cylindrical channel and having a predetermined length and diameter, said axial aperture extending through said body length and having a threaded portion of a predetermined length, said guide means body having at least one circumferentially disposed connection aperture; and wherein said linear block movement means comprises an elongated rotatable shaft disposed in and extending from said guide means axial aperture, said first and second circular heads fixed at respective ends of said shaft and being disposed in said first and second annular bores, respectively, said shaft having a predetermined length which is greater than said guide means length, said shaft having an unthreaded portion extending from a first end a predetermined length and a threaded portion extending from a second end a predetermined length to said unthreaded portion; and wherein said first head has a disk shaped configuration of a predetermined diameter and is integrally formed at said shaft first end, and said second head has a disk shaped configuration of a predetermined diameter with a threaded axial aperture, said second head being coupled to said shaft second end, said second head further having a means for locking with said shaft; whereby rotational actuation of said first circular head causes said first and second circular heads to move longitudinally with respect to said linearly guide means and to thereby adjust the position of said block portion with respect to said base portion.

13. The cutting tool holder of claim 1, further comprising means to lock said block portion in an adjusted position on said base portion.

14. The cutting tool holder of claim 13, wherein said means to lock comprises at least one circular, threaded aperture in said base portion, and at least one aperture in said block portion, said block portion aperture being disposed in said block portion and having a configuration such that it is alignable with said base portion aperture through a predetermined range of movement of said block portion with respect to said base portion, said block portion aperture further having a locking head portion, said means to lock further comprising at least one locking bolt extended through said block portion aperture and mating said base portion aperture, said locking bolt having a head for seating in said locking head portion of said block portion aperture.

15. The cutting tool holder of claim 1, wherein said base portion has means to couple with the external machine structure.

16. The cutting tool holder of claim 1, wherein said block portion means to engage at least one cutting tool comprises a slot for enclosing a portion of the cutting tool and locking screw means for engaging the enclosed cutting tool.

17. The cutting tool holder of claim 1, wherein
said base portion has a means to couple with the external structure; and
said block portion has at least one slot for enclosing a portion of said cutting tool and a locking screw means for engaging the enclosed cutting tool portion.

18. An adjustable cutting tool holder, comprising:
(a) a base portion for mounting to an external machine structure, said base portion having a top mating surface;
(b) a block portion having a bottom mating surface slidably disposed on said base portion top mating surface, said block portion having means to engage at least one cutting tool;
(c) a cylindrical void formed at the mating interface between said base portion top surface and said block portion bottom surface;
(d) an adjustment mechanism, disposed in said cylindrical void, and constructed and arranged to adjustably unite said base portion and said block portion;
(e) said cylindrical void further comprising a first annular bore open at a first end of said cutting tool holder, a cylindrical channel coaxially aligned with and extending from said first annular bore, and a second annular bore axially aligned with and extending from said channel and being open at an opposing second end of said cutting tool holder;
(f) said first and second bores and said channel of said cylindrical void each having a cylindrical surface of revolution of a predetermined radius, said surfaces of revolution comprising a top surface foraged in said block surface and a bottom surface formed in said base portion and wherein said top and bottom surfaces of said first and second cylindrical bores each have a predetermined width, said width of said first bore bottom surface being greater than said width of said first bore top surface, and said width of said second bore bottom surface being greater than said width of said second bore top surface;
(g) said base portion having means to couple with the external structure; and
(h) said block portion having at least one slot for enclosing a portion of the cutting tool and locking means for engaging the enclosed cutting tool portion.

19. The cutting tool holder of claim 18, wherein said linear guide means comprises a cylindrical body having a predetermined length and diameter, said axial aperture extending through said body length and having a threaded portion of a predetermined length, said guide means body having at least one circumferentially disposed connection aperture; and wherein said linear block movement means comprises an elongated rotatable shaft disposed in and extending from said guide mans axial aperture, and first and second circular heads fixed at respective ends of said shaft, said shaft having a predetermined length which is greater than said guide means length, said shaft having an unthreaded portion extending from a first end a predetermined length and a threaded portion extending from a second end, a predetermined length, to said unthreaded portion; and wherein said first head has a disk shaped configuration of a predetermined diameter and is integrally formed at said shaft first end, and said second head has a disk shaped configuration of a predetermined diameter with a threaded axial aperture, said second head being coupled to said shaft second end, said second head further having a means for locking with said shaft.

20. A cutting tool holder, comprising:
(a) a base portion for mounting to an external machine structure;
(b) a block portion slidably disposed on said base portion, said block portion having means to engage at least one cutting tool; and
(c) an adjustment mechanism constructed and arranged to adjustably unite said base portion and said block portion, said adjustment mechanism comprising a stationary linear guide means coupled with a rotatable linear block movement means, said linear guide means further comprising a cylindrical body having a predetermined length and diameter, an axial aperture extending through said body length and having a threaded portion of a predetermined length, said guide means body having at least one circumferentially disposed connection aperture; and wherein said linear block movement means comprises an elongated rotatable shaft disposed in and extending from said guide means axial aperture, and first and second circular heads fixed at respective ends of said shaft, said shaft having a predetermined length which is greater than said guide means length, said shaft having an unthreaded portion extending from a first end a predetermined length and a threaded portion extending from a second end, a predetermined length, to said unthreaded portion; and wherein said first head has a disk shaped configuration of a predetermined diameter and is integrally formed at said shaft first end, and said second head has a disk shaped configuration of a predetermined diameter with a threaded axial aperture, said second head being coupled to said shaft second end, said second head further having a means for locking with said shaft.

* * * * *